US012647253B2

(12) United States Patent
Wang et al.

(10) Patent No.: US 12,647,253 B2
(45) Date of Patent: Jun. 2, 2026

(54) ENCRYPTION/DECRYPTION SYSTEM, OPTICAL MODULE, AND RELATED APPARATUS AND SYSTEM

(71) Applicant: HUAWEI TECHNOLOGIES CO., LTD., Shenzhen (CN)

(72) Inventors: Jianbing Wang, Nanjing (CN); Hongjun Bi, Dongguan (CN); Jiansi Tan, Dongguan (CN); Desheng Sun, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 196 days.

(21) Appl. No.: 18/308,692

(22) Filed: Apr. 28, 2023

(65) Prior Publication Data

US 2023/0269074 A1     Aug. 24, 2023

Related U.S. Application Data

(63) Continuation of application No. PCT/CN2021/097145, filed on May 31, 2021.

(30) Foreign Application Priority Data

Nov. 12, 2020   (CN) .......................... 202011261717.3
Nov. 25, 2020   (CN) .......................... 202011339858.2

(51) Int. Cl.
      *H04L 9/00*          (2022.01)
      *H04L 9/06*          (2006.01)
(52) U.S. Cl.
      CPC ..................................... *H04L 9/065* (2013.01)

(58) Field of Classification Search
      CPC ... H04L 9/065; H04L 9/0891; H04L 63/0428; H04L 63/0457; H04L 63/166;
      (Continued)

(56) References Cited

U.S. PATENT DOCUMENTS

2005/0055546 A1    3/2005  Dzung
2005/0220305 A1*  10/2005  Fujimoto .............. G06F 21/606
                                                                        380/255
(Continued)

FOREIGN PATENT DOCUMENTS

CN          203225850 U      10/2013
CN          105357218 A  *  2/2016  ............... H04L 9/40
                        (Continued)

*Primary Examiner* — Syed M Ahsan

(57) ABSTRACT

This disclosure provides an encryption/decryption system, an optical module, and a related apparatus and system, and belongs to the field of network communications technologies. The encryption/decryption system includes an encryption/decryption component, a first interface component, and a second interface component. The encryption/decryption component is configured to encrypt a first physical layer data stream from the first interface component and transmit the encrypted first physical layer data stream to the second interface component, and is configured to decrypt a second physical layer data stream from the second interface component and transmit the decrypted second physical layer data stream to the first interface component. According to this disclosure, a delay caused by encryption/decryption during data transmission can be reduced.

25 Claims, 9 Drawing Sheets

(58) Field of Classification Search
CPC ... H04L 9/0894; H04L 9/0618; G06F 21/602;
G06F 21/85
See application file for complete search history.

(56) References Cited

U.S. PATENT DOCUMENTS

| | | | | |
|---|---|---|---|---|
| 2011/0033049 A1* | 2/2011 | Aronson | ............... | H04L 9/3271 |
| | | | | 380/256 |
| 2016/0094311 A1* | 3/2016 | Su | ......................... | H04L 1/0057 |
| | | | | 714/776 |
| 2016/0301669 A1 | 10/2016 | Muma et al. | | |
| 2019/0349763 A1 | 11/2019 | Wu et al. | | |
| 2020/0267540 A1 | 8/2020 | Tal et al. | | |

FOREIGN PATENT DOCUMENTS

| | | | |
|---|---|---|---|
| CN | 107147673 A | 9/2017 |
| CN | 111770071 A | 10/2020 |

* cited by examiner

1

ENCRYPTION/DECRYPTION SYSTEM, OPTICAL MODULE, AND RELATED APPARATUS AND SYSTEM

CROSS-REFERENCE TO RELATED APPLICATIONS

This application is a continuation of International Application No. PCT/CN2021/097145, filed on May 31, 2021, which claims priority to Chinese Patent Application No. 202011261717.3, filed on Nov. 12, 2020 and Chinese Patent Application No. 202011339858.2, filed on Nov. 25, 2020, all of which are herein incorporated herein by reference in their entireties.

TECHNICAL FIELD

This disclosure relates to the field of optical fiber communications technologies, and in particular, to an encryption/decryption system, an optical module, and a related apparatus and system.

BACKGROUND

With the development of internet technologies, an increasing amount of data is transmitted on networks, and most data is transmitted in a plaintext form on the networks. This brings many security risks. For example, private information is stolen and malicious network attacks are encountered. Therefore, it is increasingly important to ensure security of network data transmission. At present, the security of network data transmission is mainly ensured by using data encryption technologies.

A data encryption technology is the media access control security (MACsec) protocol technology. The MACsec technology is used at a data link layer of an open system interconnection (OSI) reference model, and is a standardized layer 2 encryption technology. Specifically, the MACsec technology is used between a network device A and a network device B. The network device A encrypts a data frame at the data link layer, and sends the encrypted data frame to the network device B. The network device B decrypts the encrypted data frame at the data link layer, to obtain the data frame sent by the network device A.

However, when the MACsec technology is used, a data frame further needs to be encrypted or decrypted at the data link layer, and this causes a high data transmission delay.

SUMMARY

This disclosure provides an encryption/decryption system, an optical module, and a related apparatus and system, to reduce a data transmission delay.

According to a first aspect, this disclosure provides an encryption/decryption system, where the encryption/decryption system includes an encryption/decryption component, a first interface component, and a second interface component; and the encryption/decryption component is configured to encrypt a first physical layer data stream from the first interface component and transmit the encrypted first physical layer data stream to the second interface component, and is configured to decrypt a second physical layer data stream from the second interface component and transmit the decrypted second physical layer data stream to the first interface component.

In the solution shown in this disclosure, the encryption/decryption system may encrypt the first physical layer data stream, and may decrypt the second physical layer data stream. It can be learned that encryption and decryption may be implemented at a physical layer, and a physical layer data stream instead of a data frame is directly processed. Therefore, a data delay caused during encryption/decryption can be reduced.

In a possible implementation, the encryption/decryption component is implemented in a physical layer chip, or the encryption/decryption component is implemented by invoking instructions, or the encryption/decryption component is implemented by using an independent circuit.

In this way, because a processing capability of the physical layer chip is strong, when the encryption/decryption component is implemented in the physical layer chip, the encryption/decryption can be performed more quickly. When being implemented by invoking instructions, the encryption/decryption component is implemented through software. Therefore, hardware is slightly modified. The encryption/decryption component is implemented by using the independent circuit, in other words, implemented by using an independent chip instead of software. Therefore, the encryption/decryption can also be performed quickly.

In a possible implementation, the encryption/decryption component is configured to: obtain an encryption key and a decryption key; encrypt the first physical layer data stream by using the encryption key, and decrypt the second physical layer data stream by using the decryption key.

In the solution shown in this disclosure, the encryption/decryption component may encrypt and decrypt a physical layer data stream by using a key.

In a possible implementation, the encryption/decryption component is configured to: receive execution instructions of target processing, where the target processing includes one or more of forward error correction (FEC) check, scrambling/descrambling, or 64-bit (B)/66B to 256B/257B transcoding; and perform the target processing on the first physical layer data stream and the second physical layer data stream. In this way, the target processing is performed, so that data transmission reliability is higher.

In a possible implementation, the encryption/decryption system further includes an agreement component, configured to agree upon the encryption key and the decryption key with a target network device. In this way, both communication parties may know the encryption key and the decryption key.

In a possible implementation, the agreement component is configured to: during initialization of the encryption/decryption system or when a key update period is reached, agree upon the encryption key and the decryption key with the target network device. In this way, the encryption key and the decryption key can be periodically updated, so that data transmission security is higher.

In a possible implementation, the encryption/decryption system further includes a control component, and the control component is configured to control the encryption/decryption component to perform an encryption operation or a decryption operation. In this way, whether to perform encryption/decryption can be adaptively controlled.

In a possible implementation, the control component is further configured to: receive a control signal, where the control signal indicates the encryption/decryption component to encrypt the first physical layer data stream and decrypt the second physical layer data stream; and send the control signal to the encryption/decryption component. In this way, whether to perform encryption/decryption can be adaptively controlled by sending a signal.

In a possible implementation, the control component is further configured to: obtain a status of the encryption/decryption component, and perform processing corresponding to the status. In this way, the status of the encryption/decryption component can be known in time and measures can be taken in time.

In a possible implementation, the status includes at least one of an encryption abnormality, a decryption abnormality, encryption readiness, and decryption readiness; or the status includes at least one of an encryption/decryption abnormality and encryption/decryption readiness. In this way, the encryption/decryption component can more accurately notify the control component of the status of the encryption/decryption component.

In a possible implementation, the control component is further configured to: when the status is the encryption readiness, the decryption readiness, or the encryption/decryption readiness, send a message indicating that encryption/decryption is supported. In this way, when the encryption/decryption component can start encryption/decryption, it can be announced in time that the encryption/decryption component can support the encryption/decryption, so that a physical layer data stream can be encrypted/decrypted in time.

In a possible implementation, the control component is further configured to: when the status is the encryption abnormality, the decryption abnormality, or the encryption/decryption abnormality, send an abnormality notification message. In this way, when the encryption/decryption component is abnormal, it can be announced in time that the encryption/decryption component is abnormal, and fault diagnosis can be performed on the encryption/decryption component in time.

In a possible implementation, the encryption/decryption component is configured to: when the first physical layer data stream includes a target identifier, encrypt the first physical layer data stream; and when the second physical layer data stream includes the target identifier, decrypt the second physical layer data stream. In this way, encryption/decryption of a physical layer data stream can be implemented by identifying an identifier included in a physical layer data stream.

In a possible implementation, the encryption/decryption component includes an encryption component and a decryption component, where the encryption component is configured to encrypt the first physical layer data stream, and the decryption component is configured to decrypt the second physical layer data stream. In this way, the encryption component performs encryption processing, and the decryption component performs decryption processing.

In a possible implementation, the encryption/decryption component includes a plurality of encryption channels; and each encryption channel is for encrypting one plaintext physical layer data stream from the first interface component. In this way, in a case of a plurality of encryption channels, each encryption channel is for independently encrypting one plaintext physical layer data stream, and the plaintext physical layer data streams of the plurality of encryption channels do not need to be aligned with each other, so that time spent on encryption is short, and therefore an encryption delay can be reduced.

In a possible implementation, the encryption/decryption component includes one encryption channel; and the encryption channel is for encrypting a plurality of plaintext physical layer data streams from the first interface component. In this way, the plurality of plaintext physical layer data streams can be encrypted by using one encryption channel.

In a possible implementation, the encryption channel is further for aligning the plurality of plaintext physical layer data streams before the plurality of plaintext physical layer data streams from the first interface component are encrypted. In this way, the plurality of plaintext physical layer data streams are aligned before the encryption, so that the plurality of physical layer data streams can be accurately encrypted.

In a possible implementation, the encryption/decryption component includes a plurality of decryption channels; and each decryption channel is for decrypting one ciphertext physical layer data stream from the second interface component. In this way, in a case of a plurality of decryption channels, each decryption channel is for decrypting one ciphertext physical layer data stream in parallel and independently, so that time spent on decryption is short, and a decryption delay is reduced.

In a possible implementation, the encryption/decryption component includes one decryption channel; and the decryption channel is for decrypting a plurality of ciphertext physical layer data streams from the second interface component. In this way, the plurality of ciphertext physical layer data streams can be decrypted by using one decryption channel.

In a possible implementation, the decryption channel is further for aligning the plurality of ciphertext physical layer data streams before the plurality of ciphertext physical layer data streams from the second interface component are decrypted. In this way, the plurality of ciphertext physical layer data streams are aligned before the decryption, so that the plurality of ciphertext physical layer data streams can be accurately decrypted.

In a possible implementation, the encryption/decryption system is deployed on an optical module, the first interface component is an electrical interface component, and the second interface component is an optical interface component. In this way, an electrical signal from a network device can be received by using the first interface component, and subsequent optical processing of the optical module can be better matched by using the second interface component.

In a possible implementation, the encryption/decryption system is deployed on a network device, and the first interface component and the second interface component are both electrical interface components. In this way, signals transmitted inside the network device are all electrical signals, and the optical module of the network device is connected through the second interface component.

According to a second aspect, this disclosure provides an optical module, including the encryption/decryption system according to the first aspect. In this way, the encryption/decryption system is deployed in an optical module, encryption/decryption is implemented at an Ethernet physical layer, and a stream encryption algorithm and a block encryption algorithm may be selected, so that power consumption and an encryption/decryption delay can be reduced. In addition, because the optical module is pluggable, a problem that an encryption/decryption requirement on a port of a network device cannot be dynamically adjusted can be further resolved.

In a possible implementation, the optical module further includes a microcontroller unit (MCU), and an encryption/decryption component obtains an encryption key and a decryption key through the MCU. In this way, the optical module may communicate with the connected network device through the MCU.

According to a third aspect, this disclosure provides a network device, where the network device includes a processing component, and the processing component is configured to communicate with the optical module according to the second aspect, and control the optical module to perform encryption or decryption processing on a received physical layer data stream. In this way, a network device only plays a function of controlling encryption/decryption of the optical module, and does not need to perform encryption/decryption processing. Therefore, hardware of the network device does not need to be changed, and the existing network device may be reused.

In a possible implementation, the processing component is configured to send a control signal to the optical module, where the control signal indicates the optical module to encrypt a physical layer data stream from the network device, and indicates the optical module to decrypt a physical layer data stream from a target network device.

In the solution shown in this disclosure, the processing component sends a control signal to the optical module when determining that the optical module needs to perform an encryption or decryption operation. After the optical module receives the control signal, an encryption/decryption component encrypts the physical layer data stream from the network device connected to the optical module, and the encryption/decryption component decrypts the physical layer data stream from the target network device. In this way, a first network device can control the encryption/decryption of the optical module.

In a possible implementation, the processing component is configured to control the network device to add a target identifier to a physical layer data stream sent to the optical module, where the target identifier indicates the optical module to encrypt the physical layer data stream.

For example, the processing component can control a switching chip in the network device to add the target identifier to the physical layer data stream sent to the optical module. The optical module identifies the target identifier in the physical layer data stream, and encrypts the physical layer data stream when the target identifier is identified. In this way, the network device can control the encryption/decryption of the optical module.

In a possible implementation, the processing component is further configured to agree upon an encryption key and a decryption key with the target network device communicating with the network device, and send the encryption key and the decryption key to the optical module.

In the solution shown in this disclosure, the processing component may agree upon a key with the target network device. In this way, both the network device to which the processing component belongs and the target network device can know the encryption key and the decryption key. Therefore, a physical layer data stream encrypted by using the encryption key can be correctly decrypted by the target network device.

In a possible implementation, the processing component is further configured to: during initialization of the network device or when a key update period is reached, agree upon the encryption key and the decryption key with the target network device.

In the solution shown in this disclosure, the processing component may periodically update the encryption key and the decryption key, so that data transmission security can be improved.

In a possible implementation, the processing component is further configured to: after it is determined that the optical module supports encryption/decryption, agree upon the encryption key and the decryption key with the target network device. In this way, it can be avoided that the optical module cannot encrypt/decrypt a physical layer data stream after key agreement, and invalid agreement is avoided.

In a possible implementation, the processing component is further configured to: after it is determined that the target network device supports encryption/decryption, agree upon the encryption key and the decryption key with the target network device. In this way, it may be first determined whether the target network device supports the encryption/decryption, and key agreement is performed when the encryption/decryption is supported, so that the invalid agreement is avoided.

According to a fourth aspect, this disclosure provides a network device, including the encryption/decryption system according to any one of the first aspect or the implementations of the first aspect. In this way, the encryption/decryption system is deployed on the network device. Because encryption/decryption is implemented at a physical layer, a delay caused by the encryption/decryption can be reduced.

In a possible implementation, the network device further includes a switching component; and the switching component is configured to add a target identifier to a physical layer data stream sent to the encryption/decryption system, where the target identifier indicates an optical module to encrypt the physical layer data stream. In this way, an identifier may be added to indicate the encryption/decryption system to encrypt a physical layer data stream from a first interface component.

According to a fifth aspect, this disclosure provides an encryption/decryption system, including the optical module according to the second aspect and the network device according to the third aspect. The encryption/decryption system may further include a target network device, and the target network device is configured to agree upon an encryption key and a decryption key with the optical module.

According to a sixth aspect, this disclosure provides an encryption/decryption system, including the network device according to the fourth aspect and a target network device, where the target network device is configured to agree upon an encryption key and a decryption key with the network device.

For beneficial effects of the second to sixth aspects in this disclosure, refer to the descriptions in the first aspect.

DESCRIPTION OF REFERENCE NUMERALS

1—Encryption/Decryption component; 11—Encryption component; 12—Decryption component; 13—First bit multiplexing module; 14—Target processing module; 15—Second bit multiplexing module; 111—Encryption channel; 1111—First data stream locking module; 1112—Data stream encryption selection module; 1113—Encryption module; 1114—Control code insertion module; 1115—First data stream locking and alignment module; 112—Decryption channel; 1121—Second data stream locking module; 1122—Data stream decryption selection module; 1123—Decryption module; 1124—Control code obtaining module; 1125—Second data stream locking and alignment module.

2—First interface component; 3—Second interface component; 4—Agreement component; 5—Control component; 6—MCU; 7—Processing component; 8—Switching component; 9—Optical processing component; 10—Processor.

DESCRIPTION OF EMBODIMENTS

During data transmission, data encryption/decryption at a data link layer causes a high data transmission delay. Based on this, embodiments of this disclosure provide an encryption/decryption system. The encryption/decryption system may encrypt/decrypt data at a physical layer. In this disclosure, encryption/decryption is performed on a physical layer data stream instead of a data frame at a data link layer, so that impact of data encryption/decryption on a data transmission delay can be reduced.

The encryption/decryption system provided in embodiments of this disclosure may be used in an optical module or a network device. The network device may be a device such as a switch, a router, a firewall, or a server that supports a standard Ethernet interface.

The encryption/decryption system is described as follows.

Figure 1:
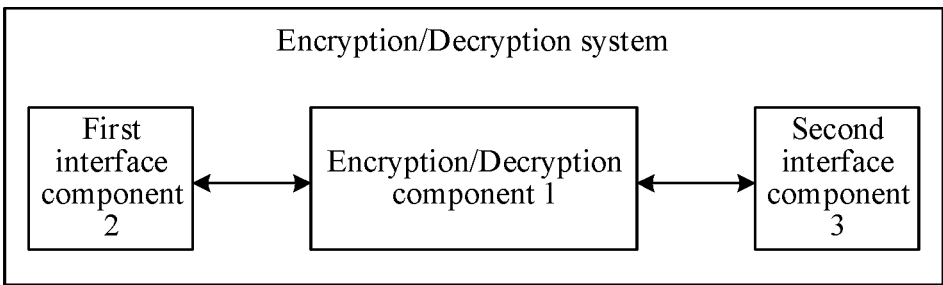
FIG. 1 is a schematic diagram of a structure of an encryption/decryption system according to an example of an embodiment of this disclosure.

As shown in FIG. 1, the encryption/decryption system includes an encryption/decryption component 1, a first interface component 2, and a second interface component 3. The first interface component 2 is electrically connected to the encryption/decryption component 1, and the encryption/decryption component 1 is electrically connected to the second interface component 3.

The encryption/decryption component 1 receives a physical layer data stream from the first interface component 2, where the physical layer data stream may be subsequently referred to as a first physical layer data stream. The encryption/decryption component 1 encrypts the first physical layer data stream, and transmits the encrypted first physical layer data stream to the second interface component 3. In this disclosure, the first physical layer data stream and the second physical layer data stream are used to distinguish between physical layer data stream sources. The first physical layer data stream may include one or more physical layer data streams, and the second physical layer data stream may also include one or more physical layer data streams.

The encryption/decryption component 1 receives a physical layer data stream from the second interface component 3, where the physical layer data stream may be subsequently referred to as a second physical layer data stream. The encryption/decryption component 1 decrypts the second physical layer data stream, and transmits the decrypted second physical layer data stream to the second interface component 3.

In this way, the encryption/decryption system in this disclosure implements encryption/decryption processing at the physical layer. Because a physical layer data stream is a bit stream, there are no extra frame overheads, and the bit stream is directly encrypted/decrypted, a data transmission delay caused by encryption/decryption at the data link layer can be reduced.

In a possible implementation, the encryption/decryption component 1 can obtain an encryption key and a decryption key, encrypt the first physical layer data stream by using the encryption key, and decrypt the second physical layer data stream by using the decryption key.

Figure 2:
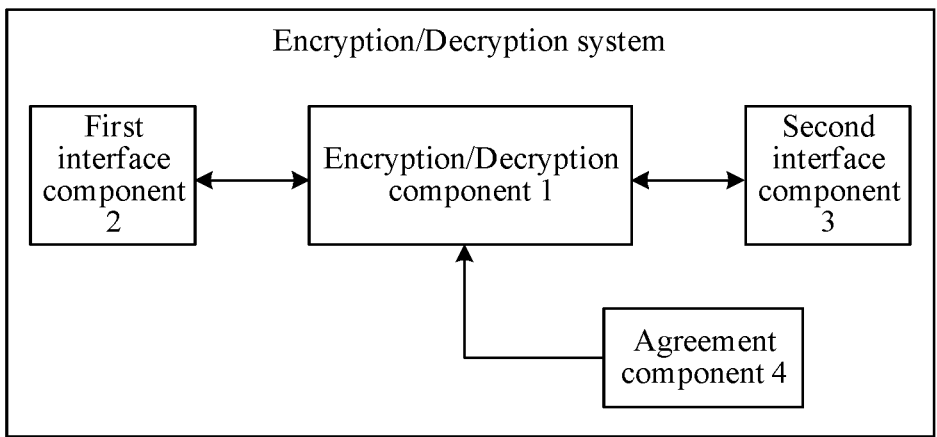
FIG. 2 is a schematic diagram of a structure of an encryption/decryption system according to an example of an embodiment of this disclosure.

The encryption/decryption system can obtain the encryption key and the decryption key through agreement. In this case, as shown in FIG. 2, the encryption/decryption system may further include an agreement component 4, where the agreement component 4 is connected to the encryption/decryption component 1, and the encryption/decryption component 1 obtains the encryption key and the decryption key from the agreement component 4.

A process of obtaining the encryption key and the decryption key by the agreement component 4 is as follows.

The agreement component 4 sends a key agreement message to a target network device, and obtains an encryption/decryption algorithm supported by the target network device. The agreement component 4 generates the encryption key and the decryption key according to the encryption/decryption algorithm supported by the target network device. The agreement component 4 sends the encryption key and the decryption key to the target network device. The target network device is a network device that communicates with the encryption/decryption system. For example, the encryption/decryption system is deployed on a first network device, a second network device communicates with the first network device, and the second network device is the target network device. For another example, the encryption/decryption system is deployed in an optical module, the optical module is connected to a first network device, the first network device communicates with a second network device, and the second network device is the target network device.

Alternatively, the agreement component 4 sends a key agreement message to the target network device to agree upon a key, where the key agreement message includes an encryption/decryption algorithm supported by the agreement component 4. The target network device generates the encryption key and the decryption key according to the encryption/decryption algorithm supported by the agreement component 4. The target network device sends the encryption key and the decryption key to the agreement component 4. The agreement component 4 receives the encryption key and the decryption key sent by the target network device.

After obtaining the encryption key and the decryption key, the agreement component 4 sends the encryption key and the decryption key to the encryption/decryption component 1.

Optionally, the agreement component 4 may agree upon the encryption key and the decryption key with the target network device during initialization of the encryption/decryption system. The initialization of the encryption/decryption system herein may be encryption/decryption system power-on initialization.

Alternatively, the encryption/decryption system stores a key update period, and the agreement component 4 agrees upon the encryption key and the decryption key with the target network device when the key update period is reached. In this way, because the encryption/decryption system can periodically update a key, data transmission security can be improved.

Figure 3:
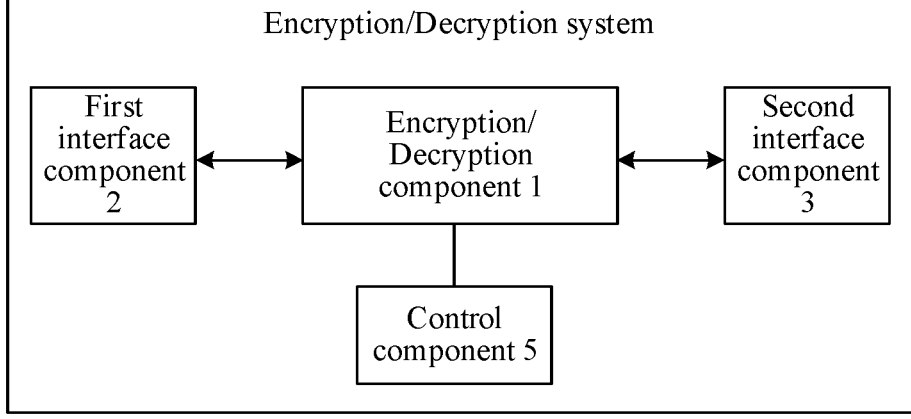
FIG. 3 is a schematic diagram of a structure of an encryption/decryption system according to an example of an embodiment of this disclosure.

In a possible implementation, as shown in FIG. 3, the encryption/decryption system may further include a control component 5, and the encryption/decryption component 1 is connected to the control component 5. The control component 5 is configured to control the encryption/decryption component 1 to perform an encryption operation or a decryption operation. In this way, the encryption operation or the decryption operation of the encryption/decryption component 1 may be more flexibly controlled.

In a possible implementation, the control component 5 is further configured to receive a control signal, where the control signal indicates the encryption/decryption component 1 to encrypt the first physical layer data stream and decrypt the second physical layer data stream. The control component 5 sends the control signal to the encryption/decryption component 1. After receiving the control signal, the encryption/decryption component 1 starts to encrypt the first physical layer data stream, and starts to decrypt the second physical layer data stream. In this way, before receiving the control signal, the encryption/decryption component 1 neither encrypts the first physical layer data stream nor decrypts the second physical layer data stream; and after receiving the control signal, the encryption/decryption component 1 encrypts the first physical layer data stream and decrypts the second physical layer data stream. It can be learned that whether the encryption/decryption component 1 performs encryption or decryption can be flexibly controlled.

In a possible implementation, when receiving the first physical layer data stream, the encryption/decryption component 1 may identify whether a target identifier exists at a preset location, and when the target identifier exists, the encryption/decryption component 1 encrypts the first physical layer data stream. When receiving the second physical layer data stream, the encryption/decryption component 1 may identify whether a target identifier exists at a preset location, and when the target identifier exists, the encryption/decryption component 1 decrypts the second physical layer data stream. In this way, a target identifier is added to a physical layer data stream that needs to be encrypted, and no target identifier is added to a physical layer data stream that does not need to be encrypted, so that a physical layer data stream that needs to be encrypted/decrypted can be accurately identified. In this solution, only a specific physical layer data stream may be encrypted or decrypted, so that processing efficiency can be further improved.

In a possible implementation, the control component 5 may further obtain a status of the encryption/decryption component 1. In a working process, the encryption/decryption component 1 sends a status to the control component 5 when a status sending condition is met. The control component 5 stores processing logic corresponding to various statuses. After receiving the status, the control component 5 identifies the status and performs processing corresponding to the status.

The status may include at least one of an encryption abnormality, a decryption abnormality, encryption readiness, and decryption readiness. The encryption abnormality indicates that an abnormality occurs when the encryption/decryption component 1 encrypts the first physical layer data stream. For example, a location at which the encryption starts cannot be found. The decryption abnormality indicates that an abnormality occurs when the encryption/decryption component 1 decrypts the second physical layer data stream. For example, the decryption cannot be performed. The encryption readiness indicates that the encryption/decryption component 1 can start the encryption operation. The decryption readiness indicates that the encryption/decryption component 1 can start the decryption operation. In this way, because various statues are separately indicated, the status of the encryption/decryption component 1 can be indicated more clearly. For example, the status includes the encryption readiness, and the control component 5 can determine that the encryption/decryption component 1 can perform the encryption operation. For another example, the status includes the decryption readiness, and the control component 5 can determine that the encryption/decryption component 1 can perform the decryption operation.

Alternatively, the status may include at least one of an encryption/decryption abnormality and encryption/decryption readiness. The encryption/decryption abnormality indicates that an abnormality occurs when the encryption/decryption component 1 encrypts the first physical layer data stream, and an abnormality occurs when the encryption/decryption component 1 decrypts the second physical layer data stream. The encryption/decryption readiness indicates that the encryption/decryption component 1 can start the encryption operation and the decryption operation. In this way, sending only the encryption/decryption abnormality can indicate that encryption and decryption abnormalities occur, and sending only the encryption/decryption readiness can indicate that the encryption/decryption component 1 can start to perform the encryption and decryption operations.

In a possible implementation, after the control component 5 receives the status sent by the encryption/decryption component 1, when determining that the status is the encryption readiness and the decryption readiness, the control component 5 determines that the encryption/decryption component 1 can start to perform the encryption and decryption operations. Alternatively, when determining that the status is the encryption/decryption readiness, the control component 5 determines that the encryption/decryption component 1 can start to perform the encryption and decryption operations.

The control component 5 sends a message indicating that encryption/decryption is supported. For example, the encryption/decryption system is deployed in the optical module, and the control component 5 sends, to a network device connected to the optical module, a message indicating that encryption/decryption is supported, to notify the network device that the optical module supports the encryption/decryption. For another example, the encryption/decryption system is deployed in the optical module, the control component 5 sends, to the agreement component 4, a message indicating that encryption/decryption is supported. The agreement component 4 determines that the optical module supports the encryption/decryption, and may agree upon a key with the target network device, where the key includes an encryption key and a decryption key.

In a possible implementation, after the control component 5 receives the status sent by the encryption/decryption component 1, when determining that the status is the encryption abnormality and the decryption abnormality, the control component 5 determines that abnormalities occur in encryption and decryption of the encryption/decryption component 1. Alternatively, when determining that the status is the encryption/decryption abnormality, the control component 5 determines that abnormalities occur in encryption and decryption of the encryption/decryption component 1.

The control component 5 sends a message indicating that encryption/decryption is supported. For example, the encryption/decryption system is deployed in the optical module, and the control component 5 sends an abnormality notification message to a network device connected to the optical module, to notify the network device that an abnormality occurs in encryption/decryption of the optical module.

Figure 4:
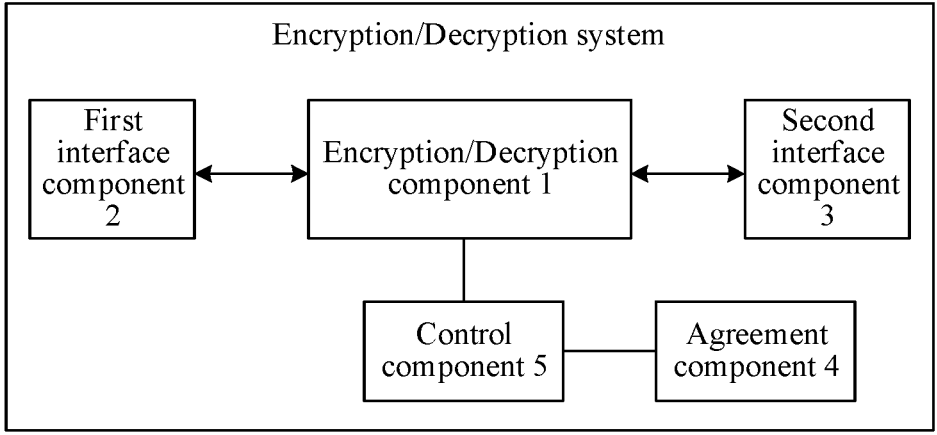
FIG. 4 is a schematic diagram of a structure of an encryption/decryption system according to an example of an embodiment of this disclosure.

In a possible implementation, as shown in FIG. 4, the agreement component 4 is connected to the control component 5. The agreement component 4 sends the encryption key and the decryption key agreed upon with the target network device to the control component 5. After receiving the encryption key and the decryption key, the control component 5 sends the encryption key and the decryption key to the encryption/decryption component 1.

Figure 5:
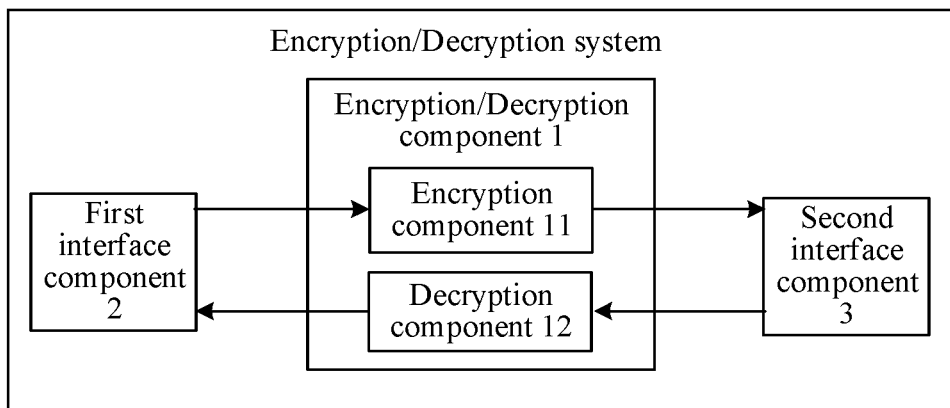
FIG. 5 is a schematic diagram of a structure of an encryption/decryption system according to an example of an embodiment of this disclosure.

In a possible implementation, as shown in FIG. 5, the encryption/decryption component 1 includes an encryption component 11 and a decryption component 12. The encryption component 11 encrypts the first physical layer data stream, and the decryption component 12 decrypts the second physical layer data stream. In correspondence to FIG. 5, if the encryption/decryption system further includes a control component 5, the control component 5 is separately connected to the encryption component 11 and the decryption component 12, the control component 5 controls the encryption component 11 to perform an encryption operation, and the control component 5 controls the decryption component 12 to perform a decryption operation.

Figure 6:
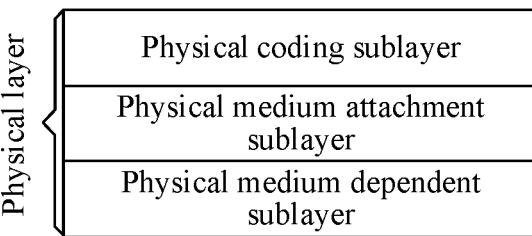
FIG. 6 is a schematic diagram of a physical layer according to an example of an embodiment of this disclosure.

In a possible implementation, as shown in FIG. 6, the physical layer includes a physical coding sublayer, a physical medium attachment sublayer, and a physical medium dependent sublayer from top to bottom. To improve data security, the encryption/decryption component 1 may further perform target processing above the physical coding sublayer. The target processing includes one or more of FEC check, scrambling/descrambling, or 64B/66B to 256B/257B transcoding. The processing is: The encryption/decryption component 1 receives execution instructions of the target processing. The encryption/decryption component 1 performs the target processing on the first physical layer data stream, and performs the target processing on the second physical layer data stream. Optionally, the control component 5 may send the execution instructions of the target processing to the encryption/decryption component 1.

If the encryption/decryption component 1 includes the encryption component 11 and the decryption component 12, the encryption component 11 includes one or more encryption channels 111, and the decryption component 12 includes one or more decryption channels 121.

Figure 10:
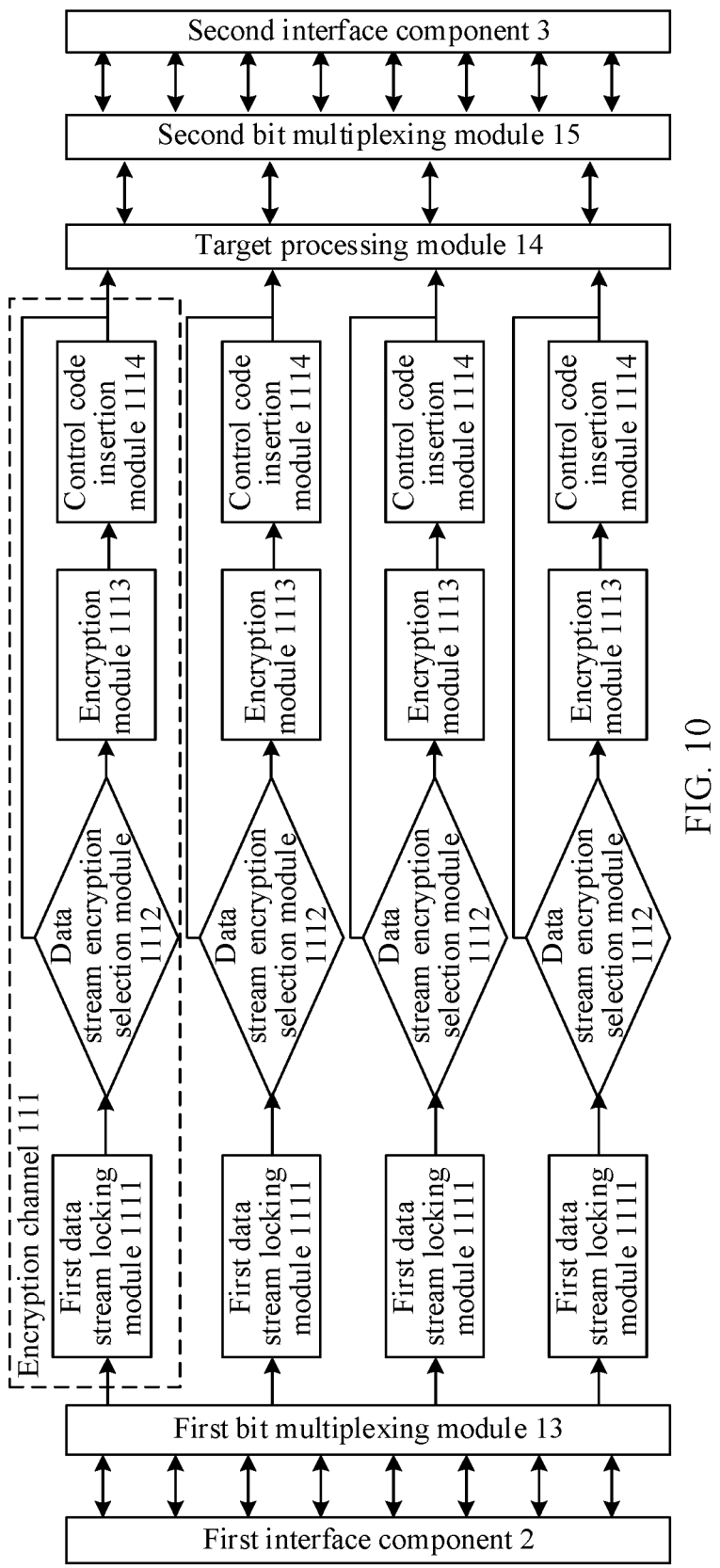
FIG. 10 is a schematic diagram of a structure for encryption in an encryption/decryption component according to an example of an embodiment of this disclosure.
Figure 11:
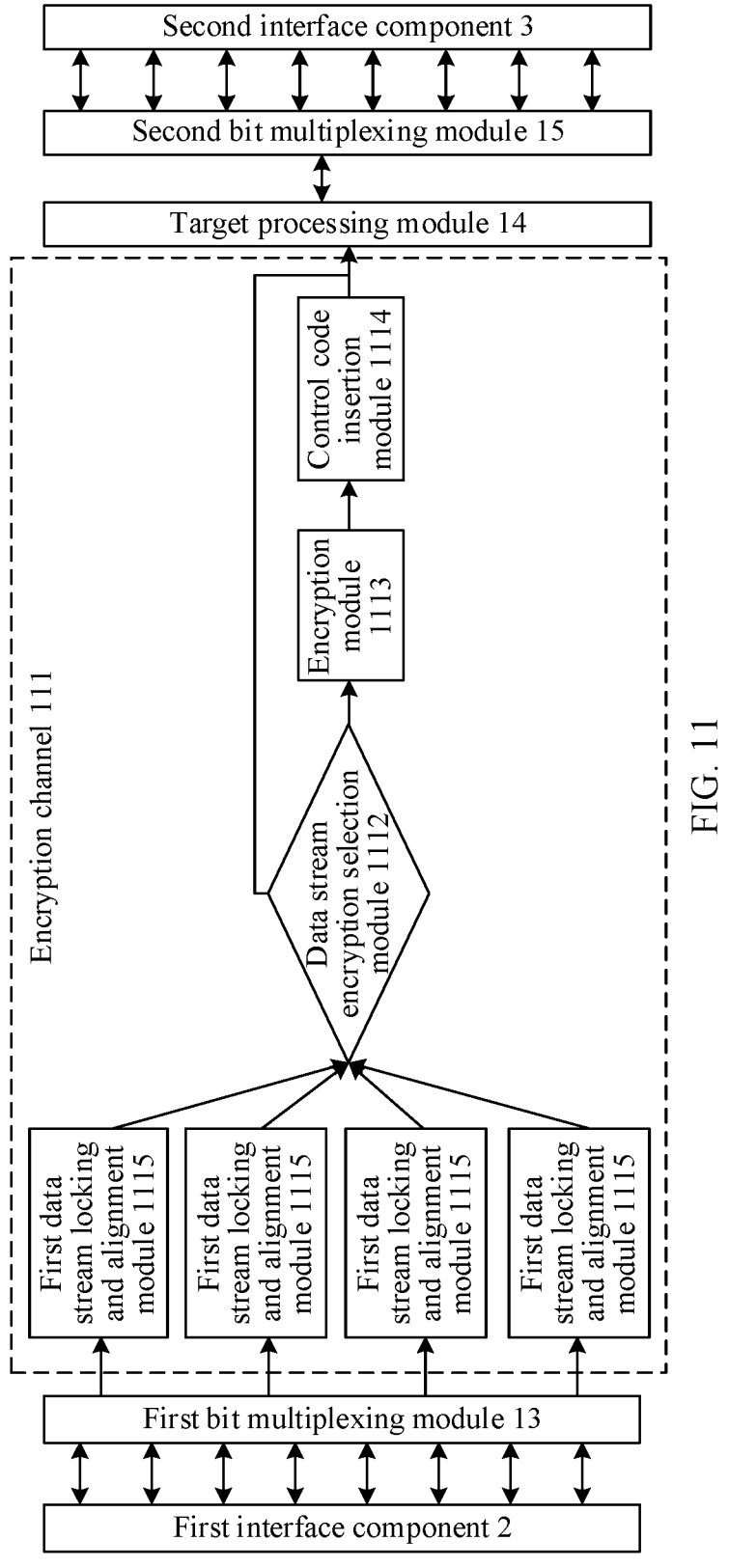
FIG. 11 is a schematic diagram of a structure for encryption in an encryption/decryption component according to an example of an embodiment of this disclosure.

In a possible implementation, the encryption/decryption component 1 includes one or more encryption channels 111. As shown in FIG. 10, if the encryption/decryption component 1 includes a plurality of encryption channels 111, each encryption channel 111 encrypts one plaintext physical layer data stream from the first interface component 2. In this way, the plurality of encryption channels 111 may encrypt a plurality of plaintext physical layer data streams in parallel, so that an encryption processing speed can be improved and a delay can be reduced. If the encryption/decryption component 1 includes only one encryption channel 111, the encryption channel 111 encrypts a plurality of plaintext physical layer data streams from the first interface component 2. As shown in FIG. 11, if the encryption/decryption component 1 includes only one encryption channel 111, before the encryption channel 111 encrypts the plurality of plaintext physical layer data streams, the plurality of plaintext physical layer data streams need to be aligned. After the alignment, the encryption channel 111 encrypts the plurality of plaintext physical layer data streams. A physical layer data stream is transmitted in a unit of a data block. In an encryption process, alignment is for ensuring, before encryption, that data blocks of a plurality of plaintext physical layer data streams are completely received.

Figure 12:
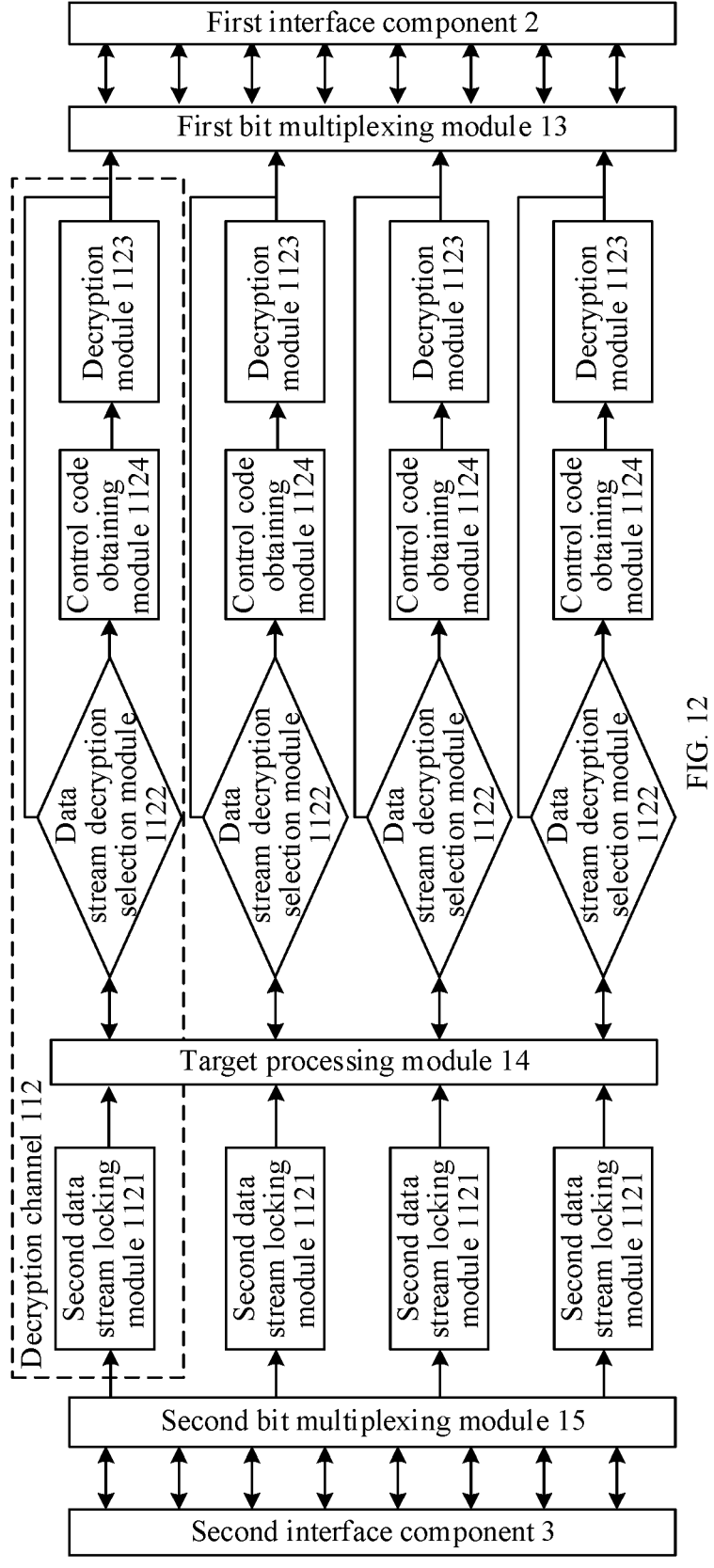
FIG. 12 is a schematic diagram of a structure for decryption in an encryption/decryption component according to an example of an embodiment of this disclosure.
Figure 13:
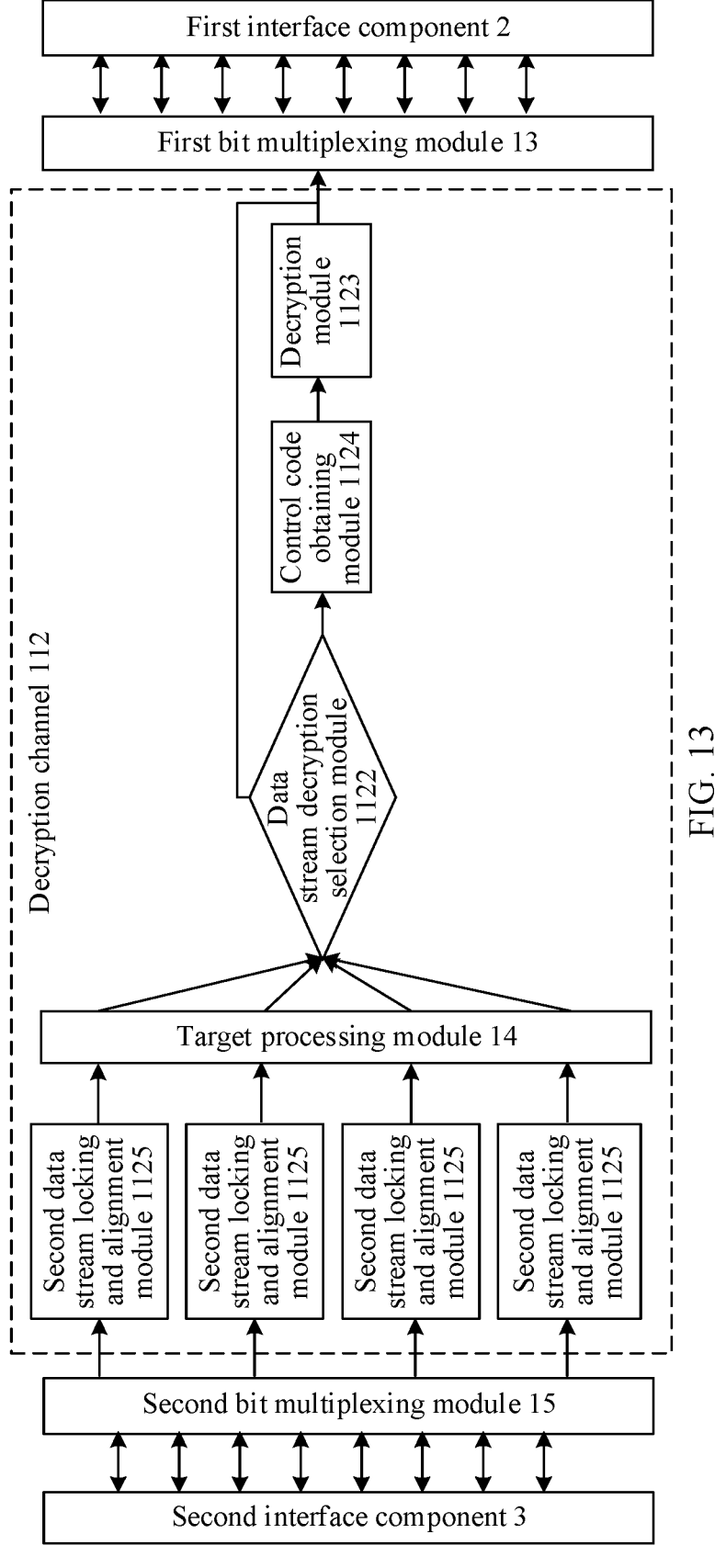
FIG. 13 is a schematic diagram of a structure for decryption in an encryption/decryption component according to an example of an embodiment of this disclosure.

In a possible implementation, the encryption/decryption component 1 includes one or more decryption channels 112. As shown in FIG. 12, if the encryption/decryption component 1 includes a plurality of decryption channels 112, each decryption channel 112 decrypts one ciphertext physical layer data stream from the second interface component 3. In this way, a plurality of ciphertext physical layer data streams can be decrypted in parallel, so that a decryption processing speed can be improved and a delay can be reduced. If the decryption component 1 includes only one decryption channel 112, the decryption channel 112 is for decrypting a plurality of ciphertext physical layer data streams from the second interface component 3. As shown in FIG. 13, if the encryption/decryption component 1 includes one decryption channel 112, before decrypting a plurality of ciphertext physical layer data streams, the decryption channel 112 needs to align the plurality of ciphertext physical layer data streams, and after the alignment, decrypt the plurality of ciphertext physical layer data streams. In a decryption process, alignment means ensuring, before decryption, that data blocks of a plurality of ciphertext physical layer data streams are completely received.

Optionally, when sending a physical layer data stream, a sender side that sends the physical layer data stream inserts an alignment header at an alignment location in each physical layer data stream, and the encryption/decryption component 1 can align the plurality of plaintext physical layer data streams by identifying the alignment header in each physical layer data stream.

In a possible implementation, the encryption/decryption component 1 encrypts the first physical layer data stream by using a stream encryption algorithm or a block encryption algorithm. The stream encryption algorithm may be an algorithm in which each encryption channel can be used for independently encrypting a physical layer data stream. The block encryption algorithm may be an algorithm in which each encryption channel is for independently performing block encryption. For example, each of a plurality of encryption channels is for performing block encryption on one plaintext physical layer data stream. Alternatively, when there is only one encryption channel, the block encryption algorithm may be for performing overall block encryption on all plaintext physical layer data streams from the first interface component 2. If the stream encryption algorithm is used during encryption, a decryption algorithm corresponding to the stream encryption algorithm is used during decryption. If the block encryption algorithm is used during encryption, a decryption algorithm corresponding to the block encryption algorithm is used during decryption.

In a possible implementation, the encryption/decryption component 1 is implemented in a physical layer chip. Optionally, when the encryption/decryption component 1 is used in the optical module, the physical layer chip may also be referred to as an optical digital signal processor (optical digital signal processor, ODSP). Because the physical layer chip has a high-speed digital processing capability, implementing the encryption/decryption component 1 in the physical layer chip can enable encryption and decryption operations to be quickly performed.

The encryption/decryption component 1 may be further implemented by invoking instructions, and the instructions are stored in a corresponding memory. In this way, hardware is slightly modified.

Alternatively, the encryption/decryption component 1 may be implemented by using an independent circuit, and the independent circuit may be considered as another chip other than a physical layer chip. For example, when the encryption/decryption component 1 is used in the optical module, in addition to the physical layer chip, the optical module further includes another chip, configured to implement the encryption/decryption component 1.

In a possible implementation, the agreement component 4 may be implemented in a physical layer chip, or the agreement component 4 is implemented by invoking instructions, or the agreement component 4 is implemented by using an independent circuit.

In a possible implementation, the control component 5 may be implemented in a physical layer chip, or the control component 5 is implemented by invoking instructions, or the control component 5 is implemented by using an independent circuit.

In embodiments of this disclosure, the encryption/decryption system may encrypt or decrypt a physical layer data stream at the physical layer, and does not need to encrypt or decrypt a data frame at the data link layer, so that encryption and decryption duration can be reduced, thereby reducing a data transmission delay.

The encryption/decryption system in the foregoing embodiments of this disclosure may be deployed in the optical module, or may be deployed in the network device.

Figure 7:
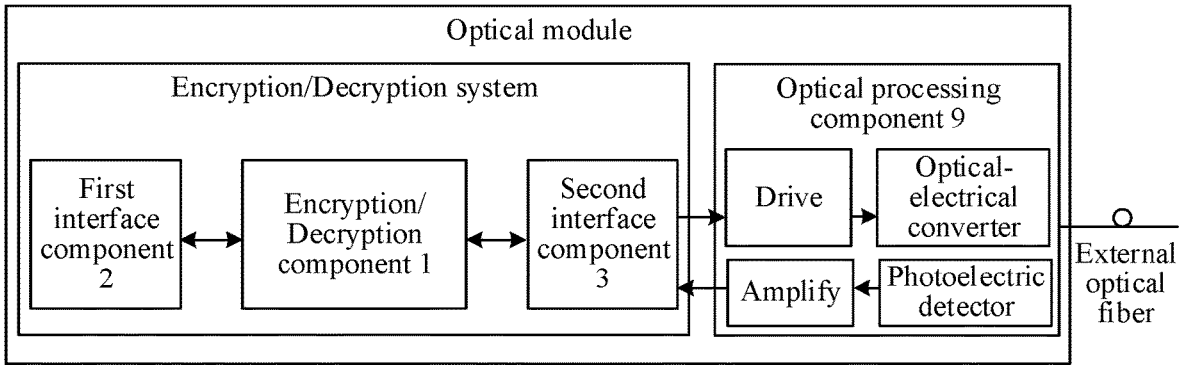
FIG. 7 is a schematic diagram of a structure of an optional module according to an example of an embodiment of this disclosure.

With reference to FIG. 7, the following describes an optical module including the foregoing encryption/decryption system. The optical module is connected to a network device, and subsequently the network device may be referred to as a first network device.

The optical module includes an encryption/decryption system, and the first interface component 2 is an electrical interface component, and is used by the optical module to communicate with the first network device. The second interface component 3 is an optical interface component, and is used by the encryption/decryption system to connect to an optical processing component 9 in the optical module. On a path for the optical module to send an optical signal to the outside, the optical processing component 9 includes a drive circuit, an optical-electrical conversion component, and the like. On a path for the optical module to receive an optical signal sent from the outside, the optical processing component 9 includes a photoelectric detection component, an amplifier, and the like. The optical processing component 9 is connected to an external optical fiber of the optical module.

Figure 8:
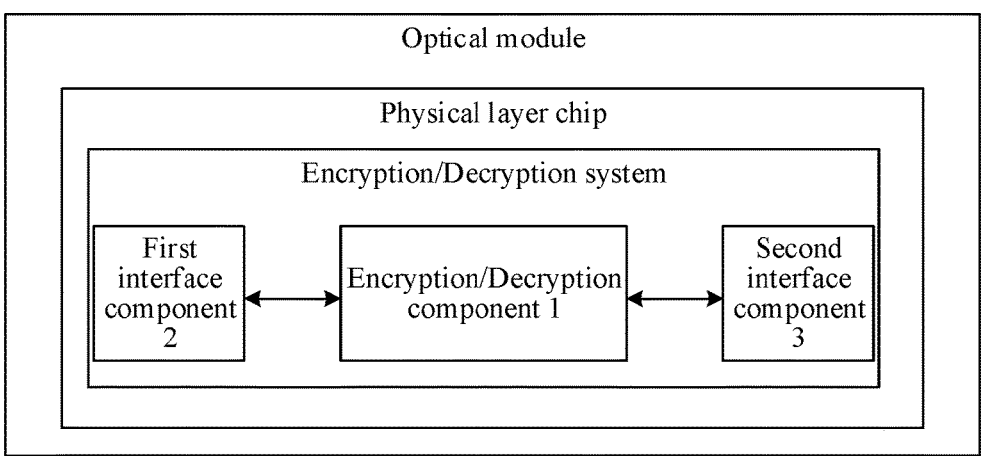
FIG. 8 is a schematic diagram of a structure of an optional module according to an example of an embodiment of this disclosure.

In a possible implementation, as shown in FIG. 8, the encryption/decryption component 1 is implemented on a physical layer chip in the optical module, and the physical layer chip may also be referred to as an ODSP.

Alternatively, the encryption/decryption component 1 is implemented in the optical module by using an independent circuit. The independent circuit is a chip independent of a physical layer chip in the optical module.

Figure 9:
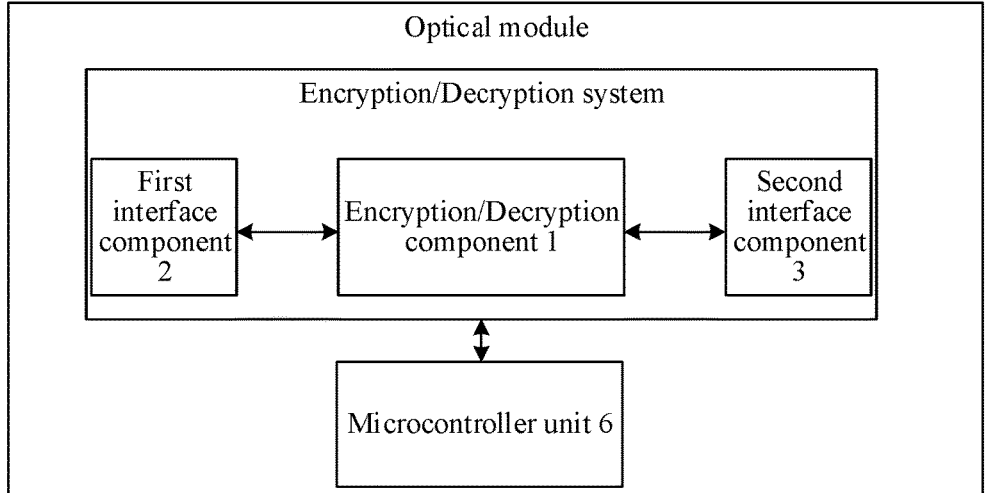
FIG. 9 is a schematic diagram of a structure of an optional module according to an example of an embodiment of this disclosure.

In a possible implementation, as shown in FIG. 9, the optical module further includes an MCU 6, and the MCU 6 is connected to the encryption/decryption system. The encryption/decryption component 1 can obtain an encryption key and a decryption key through the MCU 6.

Optionally, the MCU 6 is connected to the first network device through an integrated circuit bus (IIC). The first network device sends the encryption key and the decryption key to the MCU 6 through the IIC. The MCU 6 sends the encryption key and the decryption key to the encryption/decryption component 1.

Optionally, processing in which the MCU 6 sends the encryption key and the decryption key to the encryption/decryption component 1 is: The MCU 6 sends the encryption key and the decryption key to the control component 5, and the control component 5 sends the encryption key and the decryption key to the encryption/decryption component 1.

In a possible implementation, the first network device may further send a control signal or execution instructions of target processing to the MCU 6 through the IIC. The MCU 6 sends the control signal or the execution instructions of the target processing to the encryption/decryption component 1.

Optionally, processing in which the MCU 6 sends the control signal or the execution instructions of the target processing to the encryption/decryption component 1 is: The MCU 6 sends the control signal or the execution instructions of the target processing to the control component 5, and the control component 5 sends the control signal or the execution instructions of the target processing to the encryption/decryption component 1.

It should be noted herein that, that the first network device is connected to the MCU 6 of the optical module through the IIC may be that a processor on an interface board of the first network device is connected to the MCU 6 through the IIC.

In a possible implementation, the encryption key and the decryption key used by the encryption/decryption component 1 are agreed upon by the agreement component 4 and a target network device.

Optionally, the target network device is a network device that communicates with the first network device, and may be referred to as a second network device. The agreement component 4 sends a key agreement message to the second network device during initialization (for example, power-on initialization) of the optical module connected to the first network device or when a key update period is reached. The second network device receives the key agreement message, and when supporting encryption/decryption, sends an encryption/decryption algorithm and the like supported by the second network device to the optical module connected to the first network device. The agreement component 4 generates the encryption key and the decryption key according to the encryption/decryption algorithm supported by the second network device. The agreement component 4 sends the encryption key and the decryption key to the second network device. Subsequently, the second network device and the optical module that is connected to the first network device use the encryption key and the decryption key.

Optionally, the agreement component 4 sends a key agreement message to the second network device during initialization (for example, power-on initialization) of the optical module connected to the first network device or when a key update period is reached. The key agreement message includes an encryption/decryption algorithm and the like supported by the optical module connected to the first network device. The second network device receives the key agreement message, and when supporting encryption/decryption, the second network device generates the encryption key and the decryption key according to the encryption/decryption algorithm supported by the optical module connected to the first network device. The second network device sends the encryption key and the decryption key to the agreement component 4. Subsequently, the second network device and the optical module that is connected to the first network device use the encryption key and the decryption key.

Herein, when the agreement component 4 agrees upon the encryption key and the decryption key with the target network device, the agreement component 4 communicates with the target network device through the optical processing component 9.

In addition, the key update period herein can be adaptively adjusted. For example, based on a security requirement of a physical layer data stream, it may be determined that if the security requirement of the physical layer data stream is high, the key update period is short, or if the security requirement of the physical layer data stream is low, the key update period is long.

In a possible implementation, as shown in FIG. 10, when the encryption/decryption component 1 includes a plurality of encryption channels 111, each encryption channel 111 is connected to a first bit multiplexing module 13 in the encryption/decryption component 1, and each encryption channel 111 is connected to a target processing module 14 in the encryption/decryption component 1, and is connected to a second bit multiplexing module 15 through the target processing module 14. Each encryption channel 111 includes a first data stream locking module 1111, a data stream encryption selection module 1112, an encryption module 1113, and a control code insertion module 1114. FIG. 10 shows four encryption channels.

A process in which the encryption/decryption component 1 encrypts the first physical layer data stream is as follows.

The encryption/decryption component 1 receives the first physical layer data stream from the first interface component 2, where the first physical layer data stream includes physical layer data blocks. The first bit multiplexing module 13 allocates the first physical layer data stream to the plurality of encryption channels 111. Specifically, the first bit multiplexing module 13 sends a physical layer data block to each encryption channel 111 in a polling manner. For example, in one sending period, a $1^{st}$ physical layer data block is sent to a $1^{st}$ encryption channel, a $2^{nd}$ physical layer data block is sent to a $2^{nd}$ encryption channel, and so on. In each encryption channel 111, the first data stream locking module 1111 finds, through data stream locking, a $1^{st}$ bit of a physical layer data block entering the encryption channel 111, and identifies content of the data block. The data stream encryption selection module 1112 determines, in the manner in the foregoing, whether to encrypt the physical layer data block, and when the data stream encryption selection module 1112 determines to encrypt the physical layer data block, the encryption module 1113 encrypts the physical layer data block according to an encryption algorithm. The control code insertion module 1114 inserts an initialization vector (IV), a message authentication code (MAC), or other needed information at a specific location (for example, a header of an alignment mark (AM) data block) of the physical layer data block based on an encryption algorithm requirement, and sends the encrypted physical layer data block to the target processing module 14. When determining not to encrypt the physical layer data block, the data stream encryption selection module 1112 directly sends the physical layer data block to the target processing module 14.

The target processing module 14 performs target processing on the received physical layer data block, and sends the processed physical layer data block to the second bit multiplexing module 15. The second bit multiplexing module 15 performs bit multiplexing on a plurality of received physical layer data blocks to obtain the encrypted first physical layer data stream, and sends the encrypted first physical layer data stream to the second interface component 3. In this scenario, each encryption channel 111 is for independent encryption, and physical layer data blocks of the plurality of encryption channels 111 do not need to be aligned, thereby reducing encryption duration.

In a possible implementation, as shown in FIG. 11, the encryption/decryption component 1 includes only one encryption channel 111. The encryption channel 111 is connected to the first bit multiplexing module 13 in the encryption/decryption component 1, and the encryption channel 111 is connected to the target processing module 14 in the encryption/decryption component 1, and is connected to the second bit multiplexing module 15 through the target processing module 14. The encryption channel 111 includes a plurality of first data stream locking and alignment modules 1115, a data stream encryption selection module 1112, an encryption module 1113, and a control code insertion module 1114.

A process in which the encryption/decryption component 1 encrypts the first physical layer data stream is as follows.

The encryption/decryption component 1 receives the first physical layer data stream from the first interface component 2, where the first physical layer data stream includes physical layer data blocks. The first bit multiplexing module 13 allocates physical layer data blocks in the first physical layer data stream to different first data stream locking and alignment modules 1115. Each first data stream locking and alignment module 1115 locks each physical layer data block through data stream locking and alignment (the locking is: finding a $1^{st}$ bit of each physical layer data block, and then identifying content of each physical layer data block), and implements alignment of each physical layer data block (the alignment is: finding an alignment header of each physical layer data block, so that each first data stream determining and alignment module 1115 receives a complete data block). The first data stream determining and alignment module sends the aligned physical layer data block to the data stream encryption selection module 1112. The data stream encryption selection module 1112 receives the plurality of physical layer data blocks, determines, in the manner in the foregoing, whether to encrypt the plurality of physical layer data blocks, and when the data stream encryption selection module 1112 determines to encrypt the plurality of physical layer data blocks, the encryption module 1113 encrypts the plurality of physical layer data blocks according to an encryption algorithm. The control code insertion module 1114 inserts an initialization vector, a message authentication code, and other needed information at a specific location of each of the plurality of physical layer data blocks according to an encryption algorithm requirement, to obtain the encrypted first physical layer data stream, and sends the encrypted first physical layer data stream to the target processing module 14. When determining not to encrypt the plurality of physical layer data blocks, the data stream encryption selection module 1112 directly sends the plurality of physical layer data blocks to the target processing module 14. For subsequent processing, refer to the procedure in FIG. 10.

In a possible implementation, as shown in FIG. 12, when the encryption/decryption component 1 includes a plurality of decryption channels 112, each decryption channel 112 is in communication connection with the first bit multiplexing module 13, the target processing module 14, and the second bit multiplexing module 15 in the encryption/decryption component 1. Each decryption channel 112 includes a second data stream locking module 1121, a data stream decryption selection module 1122, a decryption module 1123, and a control code obtaining module 1124. FIG. 12 shows four decryption channels.

A process in which the encryption/decryption component 1 decrypts the second physical layer data stream is as follows.

The encryption/decryption component 1 receives the second physical layer data stream from the second interface component 3, where the second physical layer data stream includes encrypted physical layer data blocks. The second bit multiplexing module 15 allocates the physical layer data blocks in the second physical layer data stream to the plurality of decryption channels 112. For example, the second bit multiplexing module 15 allocates the physical layer data blocks to different decryption channels 112 in a polling manner. In each decryption channel 112, the second data stream locking module 1121 finds, through data stream locking, a $1^{st}$ bit of a physical layer data block entering the decryption channel 112, identifies content of the physical layer data block, and sends the physical layer data block to the target processing module 14. The target processing module 14 performs target processing on each received physical layer data block, and sends the processed physical layer data block to the data stream decryption selection module 1122. The data stream decryption selection module 1122 determines, in the manner in the foregoing, whether to decrypt the physical layer data block. When the data stream decryption selection module 1122 determines to decrypt the physical layer data block, the control code obtaining module 1124 obtains an initialization vector, a message authentication code, and other needed information from a specific location of the physical layer data block based on a decryption algorithm requirement, and sends the physical layer data block and the obtained information to the decryption module 1123. The decryption module 1123 decrypts the physical layer data block according to a decryption algorithm and based on the initialization vector, the message authentication code, and the like. When determining not to decrypt the physical layer data block, the data stream decryption selection module 1122 directly sends the physical layer data block to the first bit multiplexing module 13.

The first bit multiplexing module 13 performs bit multiplexing on the received physical layer data block, to obtain a second physical layer data stream after the multiplexing, and sends the second physical layer data stream after the multiplexing to the first interface component 2. In this scenario, each decryption channel 112 is for independent decryption, and the physical layer data blocks of the plurality of decryption channels 112 do not need to be aligned, thereby reducing decryption duration.

In a possible implementation, as shown in FIG. 13, when the encryption/decryption component 1 includes one decryption channel 112, the decryption channel 112 is in communication connection with the first bit multiplexing module 13, the target processing module 14, and the second bit multiplexing module 15 in the encryption/decryption component 1. The decryption channel 112 includes a plurality of second data stream locking and alignment modules 1125, a data stream decryption selection module 1122, a decryption module 1123, and a control code obtaining module 1124.

A process in which the encryption/decryption component 1 decrypts the second physical layer data stream is as follows.

The encryption/decryption component 1 receives the second physical layer data stream from the second interface component 3, and the second bit multiplexing module 15 allocates physical layer data blocks in the second physical layer data stream to different second data stream locking and alignment modules 1125. Each second data stream locking and alignment module 1125 locks each physical layer data block through data stream locking and alignment (the locking is: finding a $1^{st}$ bit of each physical layer data block, and identifying content of each physical layer data block), and implements alignment of each physical layer data block (the alignment is: finding an alignment header of each physical layer data block, so that each second data stream locking and alignment module 1125 receives a complete physical layer data block), and the aligned physical layer data block is sent to the target processing module 14. The target processing module 14 performs target processing on the received physical layer data block, and sends the processed physical layer data block to the data stream decryption selection module 1122. The data stream decryption selection module 1122 determines, in the manner in the foregoing, whether to decrypt the received physical layer data block. When the data stream decryption selection module 1122 determines to decrypt the physical layer data block, the control code obtaining module 1124 obtains an initialization vector, a message authentication code, and other needed information from a specific location of each physical layer data block based on a decryption algorithm requirement, and sends the physical layer data block and the obtained information to the decryption module 1123. The decryption module 1123 decrypts the received physical layer data block according to a decryption algorithm and based on the initialization vector, the message authentication code, and the like. When determining not to decrypt the physical layer data block, the data stream decryption selection module 1122 directly sends the physical layer data block to the first bit multiplexing module 13. The first bit multiplexing module 13 performs bit multiplexing on the received physical layer data block, to obtain a second physical layer data stream after the multiplexing, and sends the second physical layer data stream after the multiplexing to the first interface component 2.

Because Ethernet upper-layer processing has a specific requirement on a transmitted data stream, after reading a corresponding field, the control code obtaining module 1124 needs to perform a necessary operation such as data recovery or backfilling. In addition, the decryption algorithm needs to be the same as an encryption algorithm selected on the sender side.

In addition, to better understand embodiments of this disclosure, the following describes a procedure of transmitting a physical layer data stream.

When the optical module is connected to the first network device, a process in which the first network device sends the physical layer data stream to the outside is: The first network device sends the first physical layer data stream to the optical module, and the encryption/decryption component 1 receives the first physical layer data stream through the first interface component 2. The encryption/decryption component 1 encrypts the first physical layer data stream based on the encryption procedure shown in FIG. 10 or FIG. 11, to obtain a ciphertext physical layer data stream. The encryption/decryption component 1 sends the ciphertext physical layer data stream to the optical processing component 9 in the optical module through the second interface component 3. After performing corresponding processing, the optical processing component 9 converts the ciphertext physical layer data stream into an optical signal, and sends the optical signal to another network device through an external optical fiber.

Processing in which the first network device receives the physical layer data stream is: The optical processing component 9 of the optical module receives an optical signal from another network device through an optical fiber, converts the optical signal into an electrical signal, and sends the electrical signal to the encryption/decryption component 1 through the second interface component 3, where the electrical signal is a second physical layer data stream. The encryption/decryption component 1 decrypts the second physical layer data stream based on the decryption procedure shown in FIG. 12 or FIG. 13, to obtain a plaintext physical layer data stream, and sends the plaintext physical layer data stream to the first network device through the first interface component 2.

In embodiments of this disclosure, the encryption/decryption system is deployed in the optical module, encryption/decryption is implemented at an Ethernet physical layer, and a stream encryption algorithm and a block encryption algorithm may be selected. Therefore, power consumption and an encryption/decryption delay can be reduced. In addition, embodiments of this disclosure can further resolve a problem that an encryption/decryption requirement on a port of a network device cannot be dynamically adjusted in an existing technology. For example, in the existing technology, when a user purchases a network device, only eight fixed ports support MACsec, and this can basically meet a requirement at that time. If more MACsec ports are needed in subsequent disclosure, the network device can only be replaced. If a quantity of MACsec ports on a purchased network device is far greater than an actual requirement, excessive investment easily occurs. However, in embodiments of this disclosure, the encryption/decryption system is deployed in the optical module. The optical module has features such as being pluggable and being replaceable in real time, and an optical module encapsulation interface still meets a general module standard, is compatible with a hardware system supporting a general module, and can also meet an encryption/decryption requirement of a customer on an existing standard old system. Therefore, for a network device, when a quantity of encryption/decryption ports needs to be increased, the optical module may be newly inserted directly; or when a quantity of encryption/decryption ports needs to be reduced, the optical module may be directly removed. It can be learned that this disclosure can flexibly meet dynamic adjustment of an encryption/decryption requirement on a port of the network device.

In addition, in embodiments of this disclosure, whether encryption/decryption is performed or not may be controlled by using a control signal or a target identifier. It can be learned that the optical module in embodiments of this disclosure can be simply set to support an encryption/decryption function, and can also be used as a common optical module, so that an disclosure scenario of the optical module is improved and use costs are reduced.

When the foregoing encryption/decryption system is deployed in the optical module, a conventional network device may be upgraded by using software, or a new network device may be developed, so that the network device can cooperate with the optical module to implement encryption/decryption on a physical layer data stream. In this scenario, the network device is the first network device connected to the optical module described above, and the first network device is a device that can enable the optical module to be connected.

Figure 14:
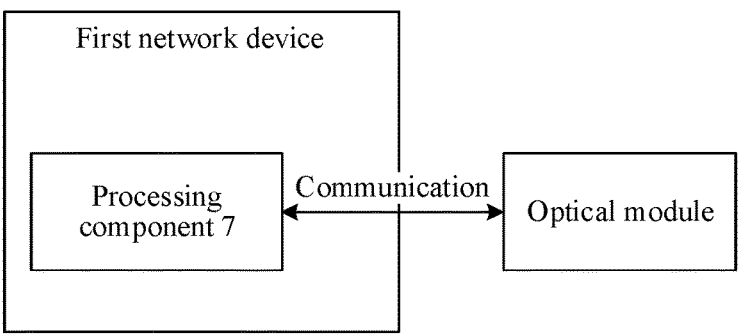
FIG. 14 is a schematic diagram of a structure of a network device according to an example of an embodiment of this disclosure.

As shown in FIG. 14, the first network device includes a processing component 7, and the processing component 7 may be a control component in the first network device. The processing component 7 communicates with the optical module mentioned above, and controls the optical module to perform an encryption or decryption operation on a received physical layer data stream.

Figure 15:
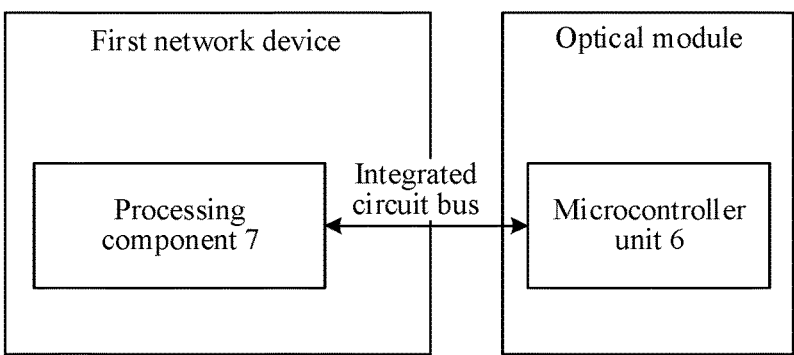
FIG. 15 is a schematic diagram of a structure of a network device according to an example of an embodiment of this disclosure.

Optionally, as shown in FIG. 15, the processing component 7 communicates with an MCU 6 in the optical module through an IIC, to implement communication with the optical module.

In a possible implementation, when the processing component 7 determines that the optical module needs to perform an encryption or decryption operation, the processing component 7 sends a control signal to the optical module. After the optical module receives the control signal, the encryption/decryption component 1 encrypts a first physical layer data stream from the first network device, and the encryption/decryption component 1 decrypts a second physical layer data stream from a target network device. Optionally, the processing component 7 communicates with the MCU 6 in the optical module through the IIC, and sends the control signal to the MCU 6. The MCU 6 sends the control signal to the control component 5, and the control component 5 sends the control signal to the encryption/decryption component 1. In this way, the first network device can control encryption/decryption of the optical module.

In a possible implementation, the processing component 7 may further control a switching component in the first network device to add a target identifier to the first physical layer data stream sent to the optical module. The optical module identifies the target identifier in the first physical layer data stream, and encrypts the first physical layer data stream when the target identifier is identified. In this way, the first network device may control the optical module to encrypt/decrypt only a specific first physical layer data stream.

The processing component 7 may control, after receiving encryption/decryption instructions, the optical module to perform an encryption or decryption operation. For example, a person skilled in the art delivers encryption/decryption instructions to the first network device through a management device of the first network device.

In a possible implementation, the processing component 7 may further agree upon a key with the target network device. Because the target network device is a network device communicating with the first network device, the target network device can decrypt data from the first network device and encrypt data sent to the first network device, only after knowing an encryption key and a decryption key.

Optionally, the processing component 7 sends a key agreement message to the target network device. The target network device receives the key agreement message, and when supporting encryption/decryption, sends a supported encryption/decryption algorithm and the like to the first network device. The processing component 7 generates the encryption key and the decryption key according to an encryption/decryption algorithm supported by the target network device. The processing component 7 sends the encryption key and the decryption key to the target network device. Subsequently, the first network device and the target network device use the encryption key and the decryption key.

Optionally, the processing component 7 sends a key agreement message to the target network device. The target network device receives the key agreement message. The key agreement message includes an encryption/decryption algorithm and the like supported by the first network device. The target network device receives the key agreement message, and when supporting encryption/decryption, the target network device generates the encryption key and the decryption key according to the encryption/decryption algorithm supported by the first network device. The target network device sends the encryption key and the decryption key to the processing component 7. Subsequently, the first network device and the target network device use the encryption key and the decryption key.

Optionally, if the processing component 7 and the target network device do not agree upon a key, the optical module and the target network device may use an encryption key and a decryption key that are uniformly configured. For example, in some scenarios, although a physical layer data stream needs to be encrypted, the physical layer data stream has a general security requirement, and an encryption key and a decryption key that are uniformly configured may be used.

It should be further noted that, the processing component 7 may agree upon a key with the target network device by using the optical module connected to the first network device, or may agree upon a key with the target network device by using another dedicated security channel.

In a possible implementation, the processing component 7 may agree upon a key with the target network device during initialization (for example, power-on initialization) of the first network device; or the processing component 7 may detect whether a key update period is reached, and agree upon a key with the target network device when the key update period is reached. In this way, the key can be periodically updated, improving data transmission security.

In a possible implementation, before agreeing upon a key with the target network device, the processing component 7 determines that the optical module supports encryption/decryption.

Optionally, the processing component 7 sends a query message to the MCU 6 of the optical module through the IIC, where the query message is for querying whether the optical module supports the encryption/decryption. The MCU 6 in the optical module sends the query message to the control component 5, and the control component 5 determines whether a status that is sent by the encryption/decryption component 1 and includes encryption readiness, decryption readiness, or encryption/decryption readiness is received. After the status is received, a message indicating that encryption/decryption is supported is sent to the MCU 6. The MCU 6 sends the message indicating that encryption/decryption is supported to the processing component 7 through the IIC. The processing component 7 receives the message indicating that encryption/decryption is supported, and determines that the optical module supports the encryption/decryption.

Optionally, after receiving the status that is sent by the encryption/decryption component 1 and includes encryption readiness, decryption readiness, or encryption/decryption readiness, the control component 5 actively sends a message indicating that encryption/decryption is supported to the MCU 6. The MCU 6 sends the message indicating that encryption/decryption is supported to the processing component 7 through the IIC. The processing component 7 receives the message indicating that encryption/decryption is supported, and determines that the optical module supports the encryption/decryption.

In a possible implementation, before agreeing upon a key with the target network device, the processing component 7 determines that the target network device supports encryption/decryption.

Optionally, the processing component 7 sends a query message to the target network device, where the query message is used to query whether the target network device supports the encryption/decryption. The target network device receives the query message, and when supporting the encryption/decryption, sends a message indicating that encryption/decryption is supported to the processing component 7. The processing component 7 receives the message indicating that encryption/decryption is supported, and determines that the target network device supports the encryption/decryption.

Optionally, during power-on initialization, the target network device and the first network device send messages to each other, to notify each other whether the target network device and the first network device support encryption/decryption. In this way, the processing component 7 can also determine whether the target network device supports the encryption/decryption.

In a possible implementation, the first network device may further receive an abnormality notification message sent by the optical module. For example, when determining that the status received from the encryption/decryption component 1 is an encryption abnormality, a decryption abnormality, or an encryption/decryption abnormality, the control component 5 sends an abnormality notification message to the MCU 6. The MCU 6 sends the abnormality notification message to the processing component 7 through the IIC, and the processing component 7 sends the abnormality notification message to the management device of the first network device. In this way, the abnormality can be reported in time.

In the foregoing implementations, if the processing component 7 agrees upon the encryption key and the decryption key with the target network device, or the encryption key and the decryption key are configured on the first network device, the processing component 7 further needs to send the encryption key and the decryption key to the optical module. In this scenario, the encryption/decryption system in the optical module may not include the agreement component 4.

In embodiments of this disclosure, the processing component 7 may implement a function of the processing component 7 by invoking computer instructions. In this way, hardware of the network device does not need to be changed, and only software of the network device needs to be upgraded, so that the existing network device can cooperate with the optical module to implement the encryption/decryption function. This reduces complexity of function upgrade and saves costs. In addition, the encryption/decryption function of the optical module is not closely related to the hardware of the network device, and can be widely used in devices such as a switch, a router, a firewall, and a server, so that an application scope is extended.

In another embodiment, the foregoing encryption/decryption system in this disclosure is deployed on a network device. To be distinguished from the foregoing descriptions, the network device is referred to as a third network device, and the third network device is also a device that can enable an optical module to be connected.

Figure 16:
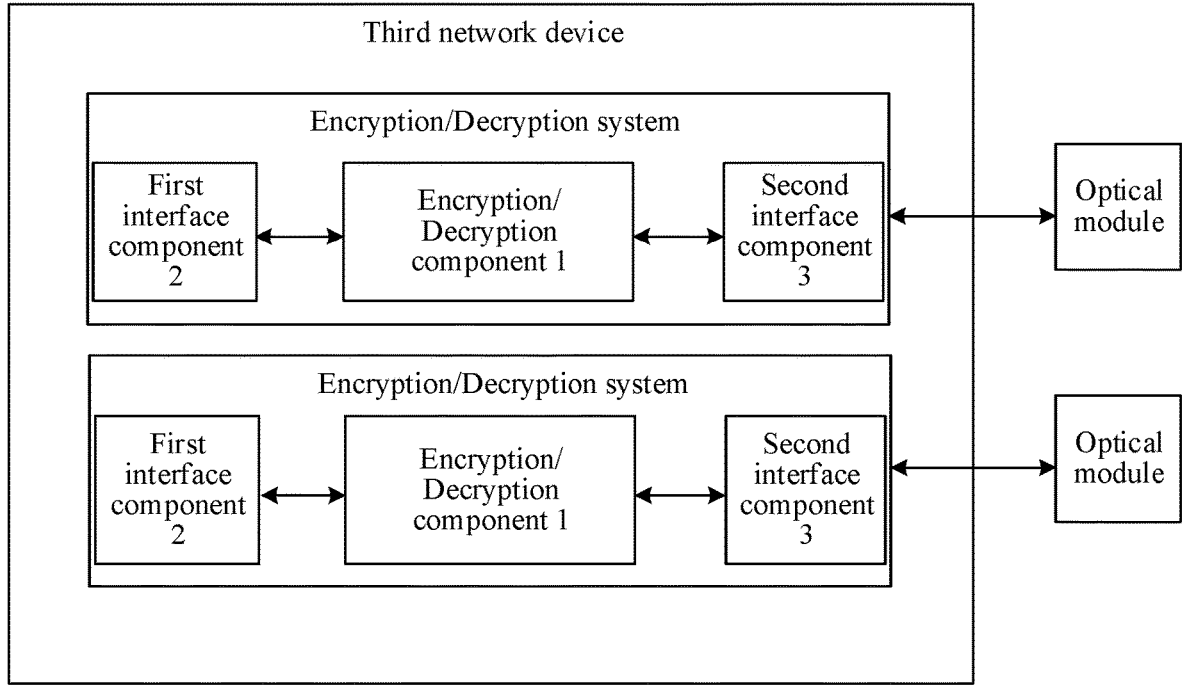
FIG. 16 is a schematic diagram of a structure of a network device according to an example of an embodiment of this disclosure.

The first interface component 2 and the second interface component 3 in the encryption/decryption system deployed on the third network device are both electrical interface components. For another structure and other processing of the encryption/decryption system, refer to the foregoing descriptions. Optionally, as shown in FIG. 16, one or more encryption/decryption systems are deployed on the third network device. Each encryption/decryption system is connected to one different optical module. The optical module connected to the third network device is a common optical module, and does not perform encryption/decryption processing.

Figure 17:
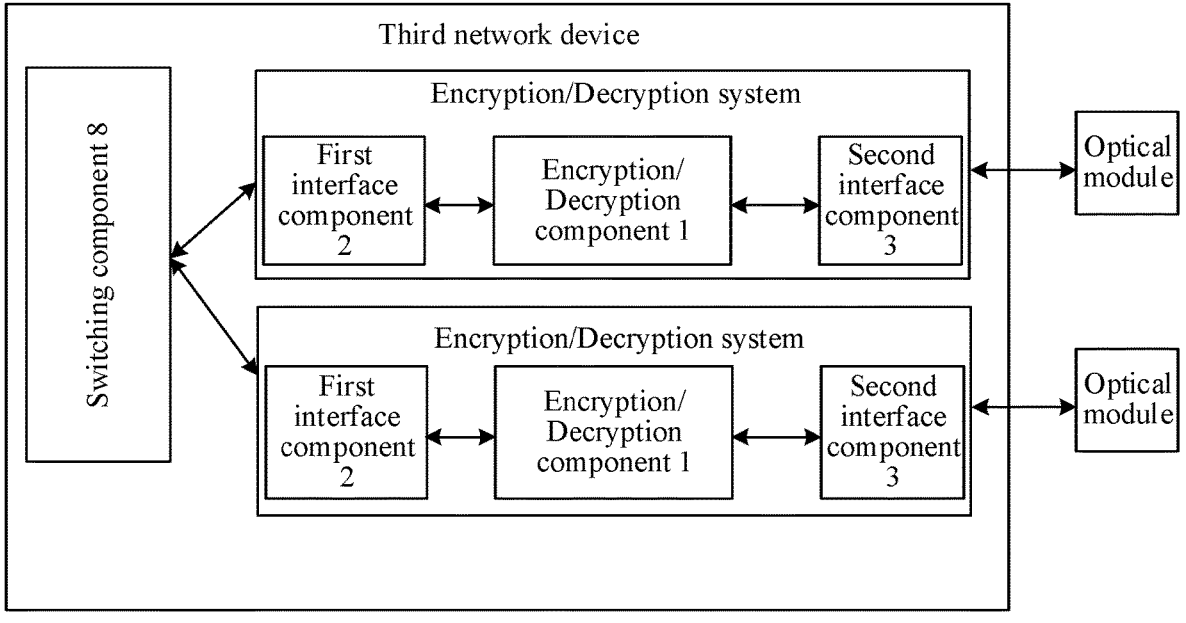
FIG. 17 is a schematic diagram of a structure of a network device according to an example of an embodiment of this disclosure.

In a possible implementation, as shown in FIG. 17, the third network device includes an encryption/decryption system and a switching component 8, and the switching component 8 may be a switching chip. The switching component 8 is electrically connected to the encryption/decryption system. The first interface component 2 is connected to the switching component 8, and the second interface component 3 is connected to an optical module connected to the third network device.

The switching component 8 may add a target identifier to a first physical layer data stream sent to the encryption/decryption system. After receiving the first physical layer data stream including the target identifier, the encryption/decryption system encrypts the first physical layer data stream.

Optionally, the switching component 8 may add a target identifier to the first physical layer data stream after identifying a key field in the first physical layer data stream, where the key field may be a key service type.

Figure 18:
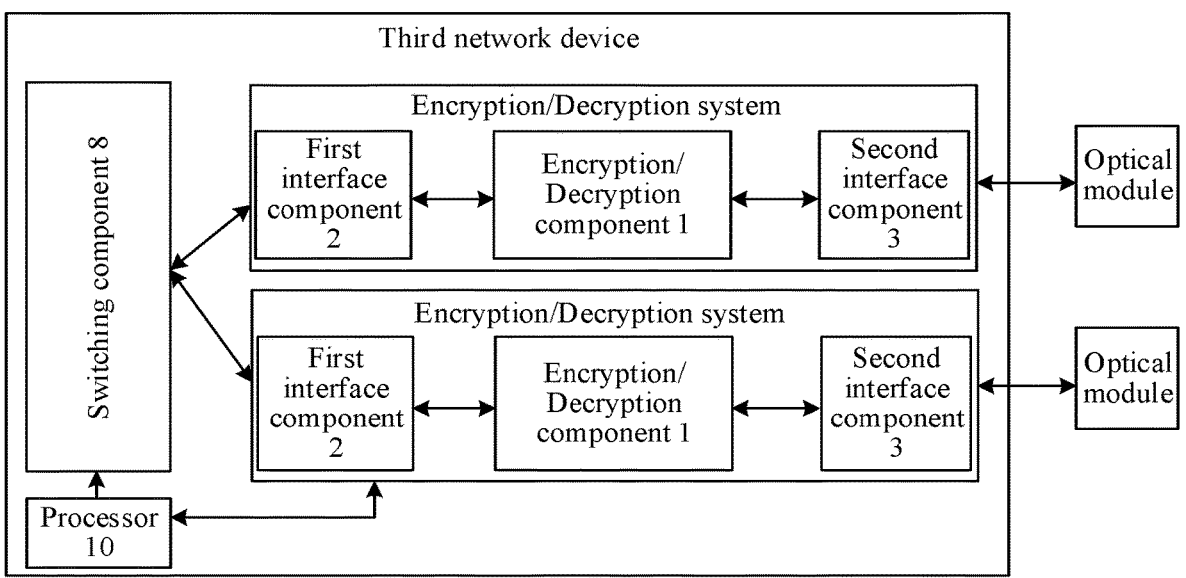
FIG. 18 is a schematic diagram of a structure of a network device according to an example of an embodiment of this disclosure.

In a possible implementation, as shown in FIG. 18, the third network device further includes a processor 10, and the processor 10 may control whether the encryption/decryption system performs encryption/decryption. For example, the processor 10 sends a control signal to the encryption/decryption system, where the control signal is for controlling the encryption/decryption component 1 to encrypt or decrypt a received physical layer data stream. For another example, the processor 10 sends encryption/decryption instructions to the switching component 8, the switching component 8 adds a target identifier to the first physical layer data stream, and after receiving the first physical layer data stream including the target identifier, the encryption/decryption system encrypts the first physical layer data stream.

In a possible implementation, the processor 10 in the third network device may further agree upon an encryption key and a decryption key with a fourth network device, and deliver the agreed-upon encryption key and decryption key to the encryption/decryption system. The fourth network device herein is a network device communicating with the third network device. For a key agreement process, refer to the foregoing descriptions.

In a possible implementation, the processor 10 in the third network device may further send execution instructions of target processing to the encryption/decryption system. The encryption/decryption system receives the execution instructions of target processing and performs the target processing.

In embodiments of this disclosure, an encryption/decryption system is deployed on a network device. Because encryption/decryption is implemented at a physical layer, low power consumption of encryption/decryption at the physical layer is achieved, and a delay caused by the encryption/decryption can be reduced.

In embodiments of this disclosure, an encryption/decryption system is further provided. Optionally, the encryption/decryption system may include the optical module on which the encryption/decryption system is deployed and the first network device that are described above, and the encryption/decryption system may further include the target network device described above. Optionally, the encryption/decryption system may include the third network device and the fourth network device that are described above.

The foregoing descriptions are only optional embodiments of this disclosure, but are not intended to limit this disclosure. Any modification, equivalent replacement, or improvement made within a principle of this disclosure should fall within the protection scope of this disclosure.

What is claimed is:

1. An encryption/decryption system, comprising an encryption/decryption circuit (1), a first interface component (2), and a second interface component (3),
   wherein the encryption/decryption circuit (1) is in a physical layer chip and configured to:
   encrypt a first physical layer data stream from the first interface component (2);
   transmit the encrypted first physical layer data stream to the second interface component (3);
   decrypt a second physical layer data stream from the second interface component (3); and
   transmit the decrypted second physical layer data stream to the first interface component (2);
   wherein the encryption/decryption circuit (1) comprises a plurality of encryption channels (111), wherein each encryption channel comprises a first data stream locking circuit (1111), and a first circuit;
   the first data stream locking circuit (1111) is configured to perform data stream locking on a bit stream entering each encryption channel (111);
   the first circuit is configured to encrypt the locked bit stream entering the each encryption channel (111) according to an encryption algorithm, and insert an initialization vector (IV) or a message authentication code (MAC).

2. The encryption/decryption system according to claim 1, wherein the encryption/decryption circuit (1) is configured to:
   obtain an encryption key and a decryption key;
   encrypt the first physical layer data stream by using the encryption key; and
   decrypt the second physical layer data stream by using the decryption key.

3. The encryption/decryption system according to claim 1, wherein the encryption/decryption circuit (1) is configured to:

receive execution instructions of target processing, wherein the target processing comprises one or more of forward error correction (FEC) check, scrambling/de-scrambling, or 64-bit B/66B to 256B/257B transcoding; and perform the target processing on the first physical layer data stream and the second physical layer data stream.

4. The encryption/decryption system according to claim 2, wherein the encryption key and the decryption key is obtained during initialization of the encryption/decryption system or when a key update period is reached.

5. The encryption/decryption system according to claim 1, wherein the encryption/decryption system further comprises a control circuit (5), and the control circuit (5) is configured to:

obtain a status of the encryption/decryption circuit (1) and perform processing corresponding to the status, wherein the control circuit is in the physical layer chip or an independent circuit.

6. The encryption/decryption system according to claim 5, wherein the status comprises at least one of an encryption abnormality, a decryption abnormality, encryption readiness, or decryption readiness; or the status comprises at least one of an encryption/decryption abnormality and encryption/decryption readiness.

7. The encryption/decryption system according to claim 5, wherein the status comprises at least one of an encryption readiness, decryption readiness, or encryption/decryption readiness, the control circuit (5) is further configured to send information indicating that encryption/decryption is supported.

8. The encryption/decryption system according to claim 5, wherein the status comprises at least one of an encryption abnormality, the decryption abnormality, or the encryption/decryption abnormality, the control circuit (5) is further configured to send information indicating abnormality.

9. The encryption/decryption system according to claim 1, wherein the encryption/decryption circuit (1) is configured to:

when the first physical layer data stream comprises a target identifier, encrypt the first physical layer data stream; and when the second physical layer data stream comprises the target identifier, decrypt the second physical layer data stream.

10. The encryption/decryption system according to claim 1, wherein the encryption/decryption circuit (1) comprises a plurality of decryption channels (112), each decryption channel (112) is for decrypting one ciphertext physical layer data stream from the second interface component (3).

11. The encryption/decryption system according to claim 1, wherein each encryption channel further comprises a data stream encryption selection circuit (1112) configured to send the bit stream from the first data stream locking circuit (1111) to the first circuit when determining to encrypt the bit stream.

12. The encryption/decryption system according to claim 1, wherein the physical layer chip is an optical digital signal processor (ODSP).

13. The encryption/decryption system according to claim 1, wherein the first circuit (1) further comprises:

an encryption circuit (1113) for each encryption channel to encrypt the locked bit stream entering the each encryption channel (111), and a control code insertion circuit (1114) for each encryption channel to insert the IV or the MAC.

14. The encryption/decryption system according to claim 1, wherein the encryption/decryption circuit (1) comprises a first bit multiplexing circuit (13) and a second bit multiplexing circuit (15), wherein the first bit multiplexing circuit (13) is configured to send the first physical layer data stream to each encryption channel (111) in a polling manner; and the second bit multiplexing circuit (15) is configured to perform bit multiplexing on a plurality of encrypted bit streams from a plurality of encryption channels to obtain the encrypted first physical layer data stream, and send the encrypted first physical layer data stream to the second interface component (3).

15. The encryption/decryption system according to claim 1, wherein the IV is in a header of an alignment mark (AM) data block.

16. The encryption/decryption system according to claim 1, wherein the first circuit is further configured to encrypt a physical layer data block in the bit stream according to the encryption algorithm.

17. The encryption/decryption system according to claim 1, wherein the encryption/decryption circuit (1) further comprises a target processing circuit (14) coupled to the first circuit, the target processing circuit (14) performs target processing on a received bit stream, the target processing comprises one or more of forward error correction (FEC) check, scrambling/descrambling, or 64-bit B/66B to 256B/257B transcoding.

18. The encryption/decryption system according to claim 1, wherein the encryption/decryption circuit (1) comprises a plurality of decryption channels (112), wherein each decryption channel comprises a second data stream locking circuit (1121), and a second circuit, wherein the second data stream locking circuit (1121) is configured to perform data stream locking on a bit stream entering the each decryption channel (112);

the second circuit is configured to obtain an initialization vector (IV) or a message authentication code (MAC), and decrypt the bit stream according to a decryption algorithm, based on the IV or the MAC.

19. The encryption/decryption system according to claim 18, wherein the encryption/decryption circuit (1) comprises a second bit multiplexing circuit (15) and a first bit multiplexing circuit (13), wherein the second bit multiplexing circuit (15) is configured to send the second physical layer data stream to each decryption channel (112) in a polling manner; and the first bit multiplexing circuit (13) is configured to perform bit multiplexing on a plurality of decrypted bit streams from a plurality of decryption channels to obtain the decrypted second physical layer data stream, and send the decrypted second physical layer data stream to the first interface component (2).

20. The encryption/decryption system according to claim 18, wherein the second circuit is further configured to decrypt a physical layer data block in the bit stream according to the decryption algorithm.

21. The encryption/decryption system according to claim 18, wherein the encryption/decryption circuit (1) further comprises a target processing circuit (14) coupled to the second circuit, the target processing circuit (14) performs target processing on a received bit stream, the target processing comprises one or more of forward error correction (FEC) check, scrambling/descrambling, or 64-bit B/66B to 256B/257B transcoding.

22. The encryption/decryption system according to claim 18, wherein each encryption channel further comprises a data stream decryption selection circuit (1122) configured to send the bit stream entering the each decryption channel (112) to the second circuit when determining to decrypt the bit stream entering the each decryption channel (112).

23. A network device, comprising an encryption/decryption system according to claim 1.

24. The network device according to claim 23, wherein the first physical layer data stream comprises a target identifier, wherein the network device further comprises a switching circuit (8) that is a switching chip and configured to insert the target identifier; and the encryption/decryption circuit (1) in the physical layer chip is configured to perform encryption on the first physical layer data stream based on the target identifier.

25. An optical module, comprising an encryption/decryption system according to claim 1.

\* \* \* \* \*